(12) United States Patent
Kodama

(10) Patent No.: US 6,275,618 B1
(45) Date of Patent: *Aug. 14, 2001

(54) APPARATUS FOR AND METHOD OF PROCESSING IMAGES

(75) Inventor: Yasumasa Kodama, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,987

(22) Filed: Aug. 13, 1997

(30) Foreign Application Priority Data

Aug. 14, 1996 (JP) .................................. 8-214588

(51) Int. Cl.⁷ ...................................... G06K 9/36
(52) U.S. Cl. ...................... 382/238; 382/236; 386/68; 348/419
(58) Field of Search .................... 382/238, 236; 386/68, 4; 348/419; 709/247

(56) References Cited

U.S. PATENT DOCUMENTS

| | | | |
|---|---|---|---|
| 5,521,927 | * 5/1996 | Kim et al. ...................... | 370/94.2 |
| 5,732,183 | * 3/1998 | Sugiyama ...................... | 386/4 |
| 5,751,888 | * 5/1998 | Fukuchi et al. ................ | 386/68 |
| 5,754,241 | * 5/1998 | Okada et al. .................. | 348/419 |
| 5,774,206 | * 6/1998 | Wasserman et al. ........... | 709/247 |
| 5,838,678 | * 11/1998 | Davis et al. ................... | 370/389 |

* cited by examiner

*Primary Examiner*—Jose L. Couso
*Assistant Examiner*—Anh Hong Do
(74) *Attorney, Agent, or Firm*—Frommer Lawrence & Haug, LLP.; William S. Frommer; Dexter T. Chang

(57) ABSTRACT

Disclosed is an apparatus for processing images with which, when bit streams of images subjected to the MPEG coding in the form of open GOP are joined to each other, image quality is prevented from deteriorating at the joint between the bit streams. In the apparatus for processing images, when a bit stream Y is inserted in a bit stream X, before-I-picture B-pictures (B-pictures appearing before an I-picture is displayed) which are part of images forming first one of GOP's in the bit stream Y are deleted. Temporal references of the remaining images forming the first GOP are then changed. The before-I-picture B-pictures, which are otherwise predicted by using one of images forming the last GOP of the bit stream X, are not longer displayed.

19 Claims, 10 Drawing Sheets

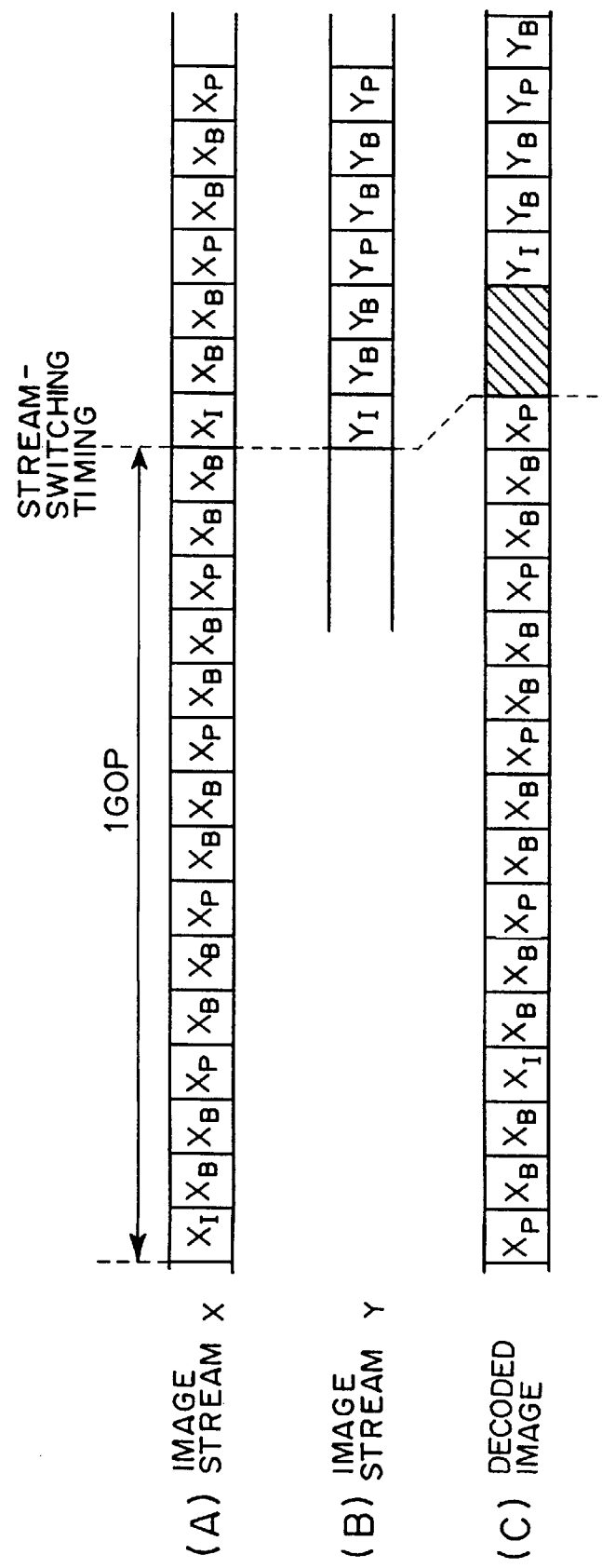

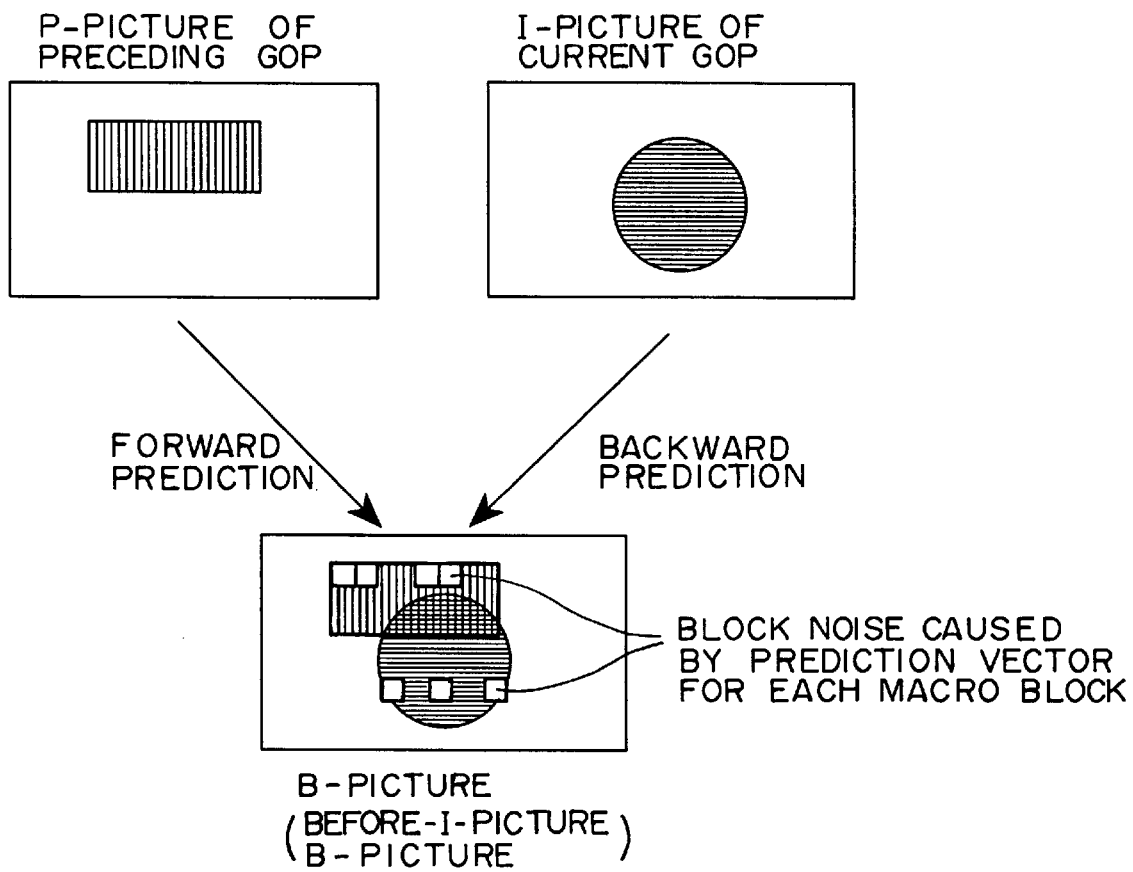

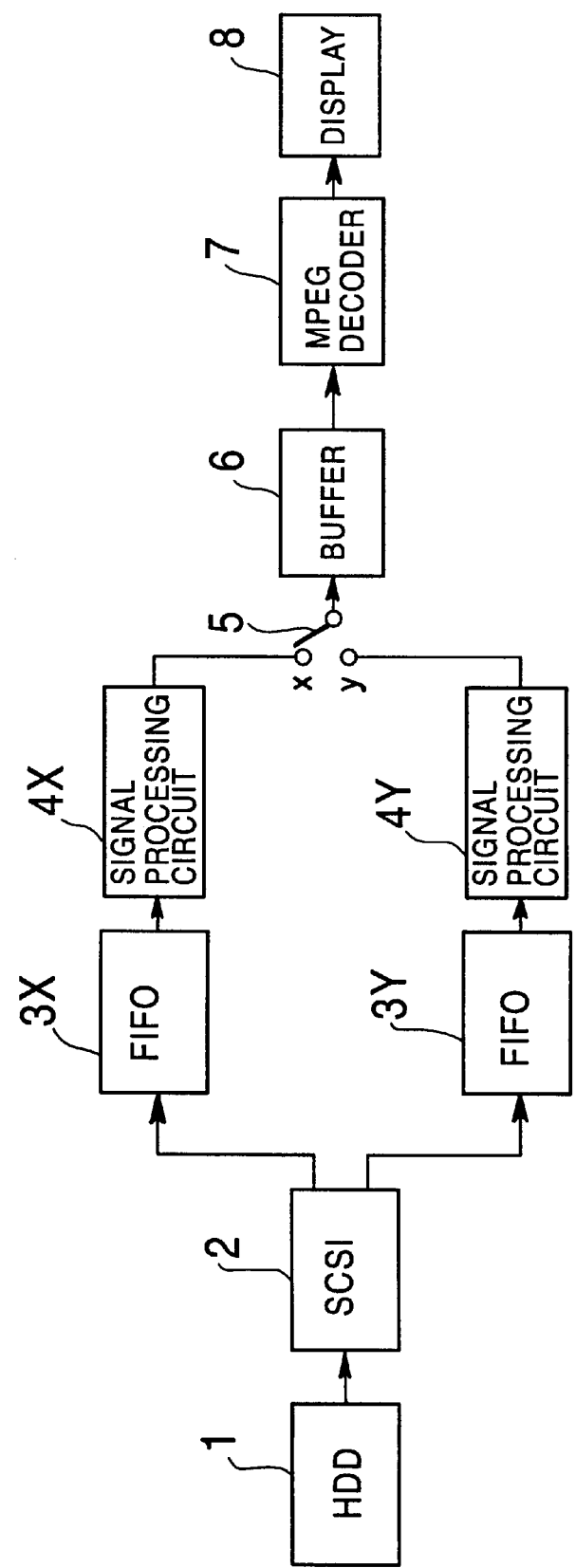

APPARATUS FOR AND METHOD OF PROCESSING IMAGES

BACKGROUND OF THE INVENTION

1. Field of the Invention

The present invention relates to an apparatus for and a method of processing images, and a recording medium. More particularly, the present invention relates to an apparatus for and a method of processing images, and a recording medium with which images subjected to the MPEG (Moving Picture Experts Group) coding in the form of open GOP (Group Of Pictures) can be reproduced without changing image quality.

2. Description of the Related Art

In the MPEG coding, an image of a certain frame (field) is predicted from frames before and behind the frame so that random access can be made in units of GOP comprising several frames grouped together.

Meanwhile, the GOP is divided into a closed GOP in which prediction is performed by using only images belonging to itself, as shown in FIG. 1A, and an open GOP in which the first B-picture of a certain GOP is predicted by using not only an I-picture belonging to that GOP, but also a P-picture forming one image of the preceding GOP, as shown in FIG. 1B.

On condition that a quantity of codes is kept the same, the closed GOP is inferior in image quality to the open GOP. Conversely, to obtain image quality by the closed GOP at the same level as obtained by the open GOP, a quantity of codes is increased. From the standpoints of improving image quality and reducing a quantity of codes, therefore, the open GOP is generally employed.

The open GOP has however accompanied a problem below. When image editing of, for example, inserting in one MPEG bit stream X shown in FIG. 2(A) the other MPEG bit stream Y shown in FIG. 2(B) is performed, image quality is remarkably deteriorated in hatched portions of the decoded images, shown in FIG. 2(c), at the joint between the bit streams X and Y.

More specifically, of B-pictures of images forming one GOP, those B-pictures locating upstream of an I-picture in the same GOP (hereinafter referred to as before-I-picture B-pictures) are predicted in two-way directions from the I-picture and a P-picture as one of images forming the preceding GOP. When the other bit stream Y is joined to one bit stream X, therefore, each of the before-I-picture B-pictures in the first GOP of the bit stream Y is predicted by both backward prediction using an I-picture in that GOP (current GOP) and forward prediction using a P-picture in the last GOP (preceding GOP) of the bit stream X which has no relation with the bit stream X, as shown in FIG. 3. This has raised a problem that block noises are generated and image quality is remarkably deteriorated.

To overcome such a problem, there is proposed a method of setting a broken link flag specified in the GOP layer, for example, in the bit stream after being edited, and causing an MPEG decoder to recognize that the bit stream has been edited. Then, the MPEG decoder does not display the before-I-picture B-pictures in the GOP for which the broken link flag is set, but continues to display the image prior to those before-I-picture B-pictures.

The MPEG decoder is however not always designed to be able to detect the broken link flag and hence cannot deal with all the cases.

SUMMARY OF THE INVENTION

An object of the present invention is to provide an apparatus for processing images which can easily prevent deterioration in quality of images subjected to the MPEG coding in the form of open GOP.

To achieve the above object, an apparatus for processing images, according to the present invention, comprises GOP detecting means for detecting GOP's from a bit stream, picture-type detecting means for detecting the picture types of images forming each of the GOP's, and deleting means for deleting B-pictures of images forming one GOP in the bit stream, which are to be predicted by using one of images forming another GOP preceding the one GOP, in accordance with the detected picture types.

Also, a method of processing images, according to the present invention, comprises the steps of detecting GOP's from a bit stream, detecting the picture types of images forming at least one of the GOP's, and deleting B-pictures of images forming one GOP in the bit stream, which are to be predicted by using one of images forming another GOP preceding the one GOP, in accordance with the detected picture types.

Further, a recording medium according to the present invention records therein a bit stream deprived of B-pictures of images forming one GOP in the bit stream which are to be predicted by using one of images forming another GOP preceding the one GOP.

BRIEF DESCRIPTION OF THE DRAWINGS

FIGS. 2(A) to 2(C) are charts for explaining the result of editing when a bit stream Y is inserted in a bit stream X.

FIG. 3 is an illustration showing block noises generated when the bit stream Y is inserted in the bit stream X.

FIG. 4 is a block diagram showing the configuration of one embodiment of an editing system to which the present invention-is applied.

DETAILED DESCRIPTION OF THE PREFERRED EMBODIMENT

Figure 1A:
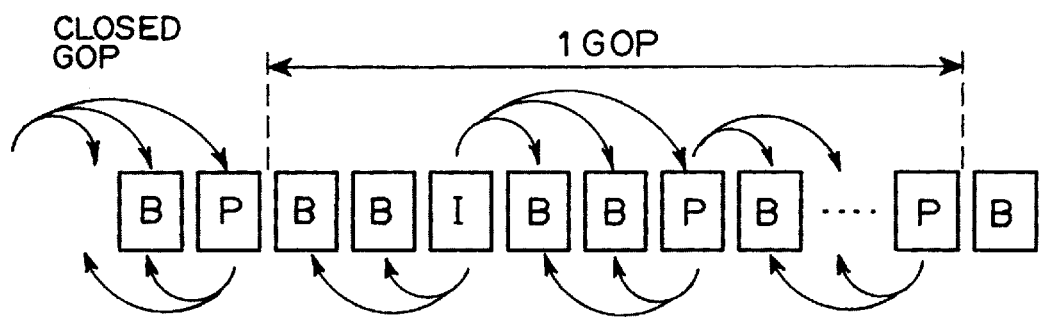
FIGS. 1A and 1B are charts for explaining a closed GOP and an open GOP, respectively.
Figure 1B:
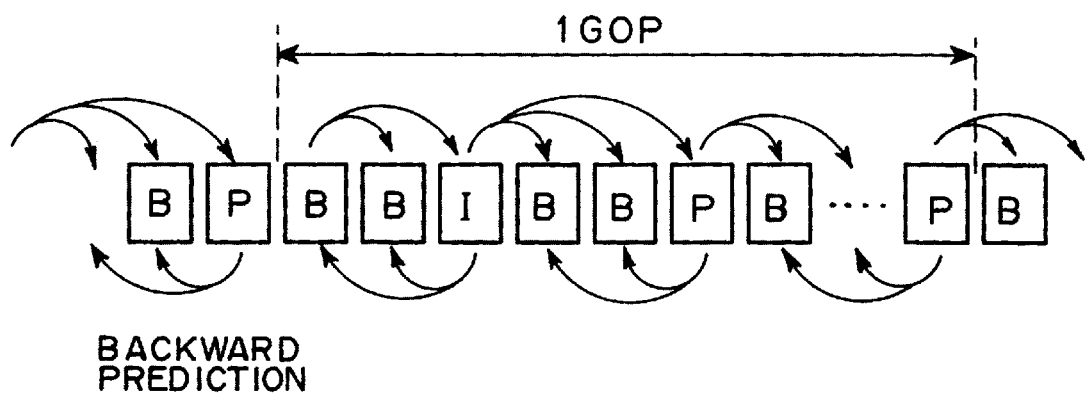

FIG. 4 shows the configuration of one embodiment of an editing system to which the present invention is applied.

An HDD (Hard Disk Drive) 1 records therein bit streams of images subjected to the MPEG coding in the form of open GOP. In this embodiment, two types of bit streams X and Y, for example, are recorded in the HDD 1. Assuming that an I-picture, a P-picture and a B-picture are indicated respectively by I, P and B, one GOP is made up of, e.g., fifteen images of $B_0$, $B_1$, $I_2$, $B_3$, $B_4$, $P_5$, $B_6$, $B_7$, $P_8$, $B_9$, $B_{10}$, $P_{11}$, $B_{12}$, $B_{13}$, and $P_{14}$. These images are coded in the order of $I_2$, $B_0$, $B_1$, $P_5$, $B_3$, $B_4$, $P_8$, $B_6$, $B_7$, $P_{11}$, $B_9$, $B_{10}$, $P_{14}$, $B_{12}$ and $B_{13}$ with a GOP head locating in the first position. Here, the numerals suffixed to I, P and B denote the sequence of images displayed and correspond to temporal references specified in the picture layer. The temporal reference is an integer of 10 bits which is reset at the start of the GOP.

An SCSI (Small Computer System Interface) circuit 2 performs communication between itself and the HDD 1 in conformity with SCSI standards, thereby reading the bit streams X and Y from the HDD 1 and supplying them to FIFO (First-In First-Out) memories 3X and 3Y The FIFO memories 3X and 3Y temporarily stores the bit streams X and Y supplied from the SCSI circuit 2 and output them to signal processing circuits 4X and 4Y, respectively.

The signal processing circuits 4X and 4Y execute predetermined processing on the bit streams supplied from the FIFO memories 3X and 3Y, as needed, and output the processed bit streams to terminals x and y of a switch 5, respectively. The switch 5 selects the terminal x or y for delivering the bit stream X or Y supplied from the signal processing circuit 4X or 4Y to a buffer 6.

The buffer 6 temporarily stores the bit stream from the switch 5 and then supplies it to an MPEG decoder 7. Also, the buffer 6 can supply the bit stream stored therein to a recording medium 9, e.g., an optical disk, a magneto-optical disk, a magnetic disk or a magnetic tape, for recording.

The MPEG decoder 7 requests the buffer 6 to supply data to it, and in response to the request, the buffer 6 supplies the bit stream to the MPEG decoder 7. The MPEG decoder 7 executes the MPEG decoding of the supplied bit stream and then supplies decoded data to a display 8 for displaying images thereon.

The operation of the editing system will be described below in connection with, by way of example, the case of inserting (joining) the bit stream Y in (to) the bit stream X.

First, the SCSI circuit 2 reads the bit stream X from the HDD 1 in units of GOP, as shown in FIG. 5(A). In the illustrated embodiment, after reading the bit stream X of two GOP'S, for example, the SCSI circuit 2 reads the bit stream Y in units of GOP likewise. The bit streams X and Y read from the HDD 1 are supplied to and stored in the FIFO memories 3X and 3Y, respectively, as shown in FIGS. 5(B) and 5(C).

Note that while the bit streams X and Y are shown in FIG. 5(A) as being read from the HDD 1 at a high speed in a burst mode, the bit streams X and Y may be each read successively.

The bit stream X of two GOP's supplied from the SCSI circuit 2 is temporarily stored in the FIFO memory 3X and then read therefrom successively at a predetermined rate, as shown in FIG. 5(D). The bit stream X read from the FIFO memory 3X is supplied to the terminal x of the switch 5 through the signal processing circuit 4X.

At this time, the switch 5 selects the terminal x. Accordingly, as shown-in FIG. 5(F), the bit stream X is output from the switch 5 to the buffer 6. The buffer 6 temporarily stores the bit stream X from the switch 5 and then supplies it to the MPEG decoder 7. The MPEG decoder 7 executes the MPEG decoding of the bit stream X and then supplies decoded data to the display 8 for displaying images.

On the other hand, the bit stream Y of three GOP's supplied from the SCSI circuit 2 is likewise temporarily stored in the FIFO memory 3Y and, after the bit stream X of two GOP's has been read from the FIFO memory 3x, is read therefrom successively at a predetermined rate, as shown in FIG. 5(E). The bit stream Y read from the FIFO memory 3Y is supplied to the signal processing circuit 4Y.

The signal processing circuit 4Y deletes the before-I-picture B-pictures from images forming the first GOP of the bit stream Y supplied from the FIFO memory 3Y and changes the temporal references, followed by supplying the bit stream Y to the terminal y of the switch 5.

At this time, the switch 5 is changed over from the terminal x to y. Accordingly, as shown in FIG. 5(F), the bit stream Y is output from the switch 5 to the buffer 6. The buffer 6 temporarily stores the bit stream Y from the switch 5 and then supplies it to the MPEG decoder 7. The MPEG decoder 7 executes the MPEG decoding of the bit stream Y and then supplies decoded data to the display B for displaying images.

Figure 6:
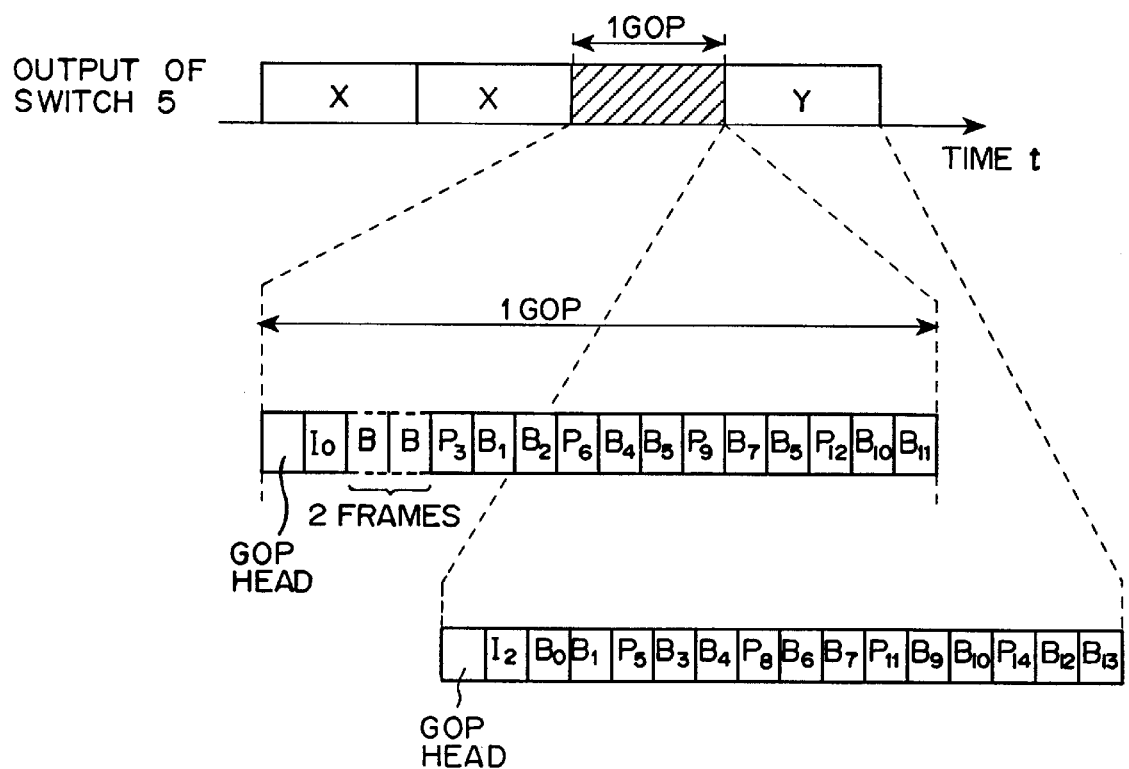
FIG. 6 is a chart showing the configuration of GOP's output from a switch 5 in FIG. 4.

Here, the bit stream Y output from the switch 5 is modified, as shown in FIG. 6, such that just two frames of the before-I-picture B-pictures in the first GOP of the bit stream Y are deleted. The before-I-picture B-pictures, which are otherwise predicted by using one of images forming the last GOP of the bit stream X as conventionally, are therefore no longer displayed on the display 8. As a result, image quality can be prevented from deteriorating at the joint between the bit streams X and Y.

For the second and subsequent GOP's of the bit stream Y, the signal processing circuit 4Y executes no extra processing and, as conventionally, outputs images of each GOP in the order of $I_2$, $B_0$, $B_1$, $P_5$, $B_3$, $B_4$, $P_8$, $B_6$, $B_7$, $P_{11}$, $B_9$, $B_{10}$, $P_{14}$, $B_{12}$ and $B_{13}$ with a GOP head locating in the first position (FIG. 6).

Images resulted from inserting (joining) the bit stream Y to (in) the bit stream X, as explained above, are confirmed on the display 8. If there are no problems, the joined bit stream stored in the buffer 6 is supplied to the recording medium for recording.

Figure 7:
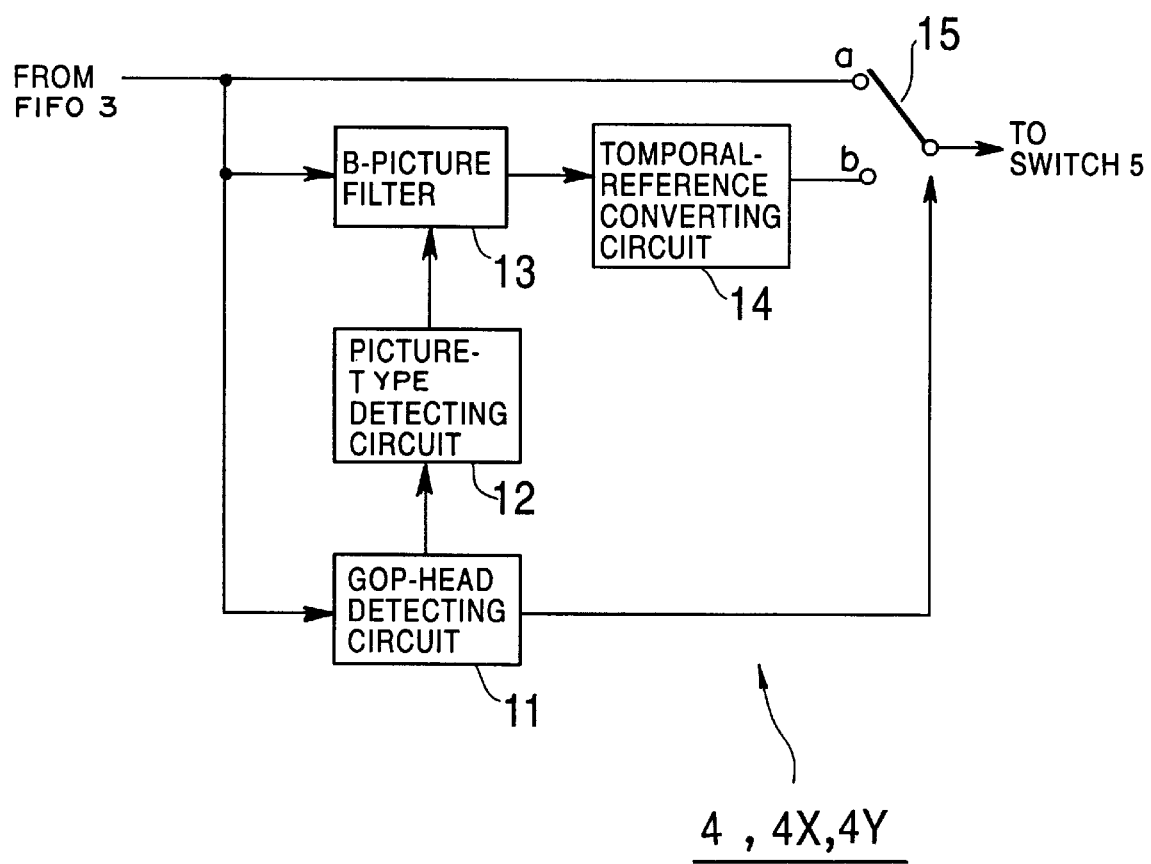
FIG. 7 is a block diagram showing an example of the configuration of signal processing circuits 4X and 4Y in FIG. 4.
Figure 8:
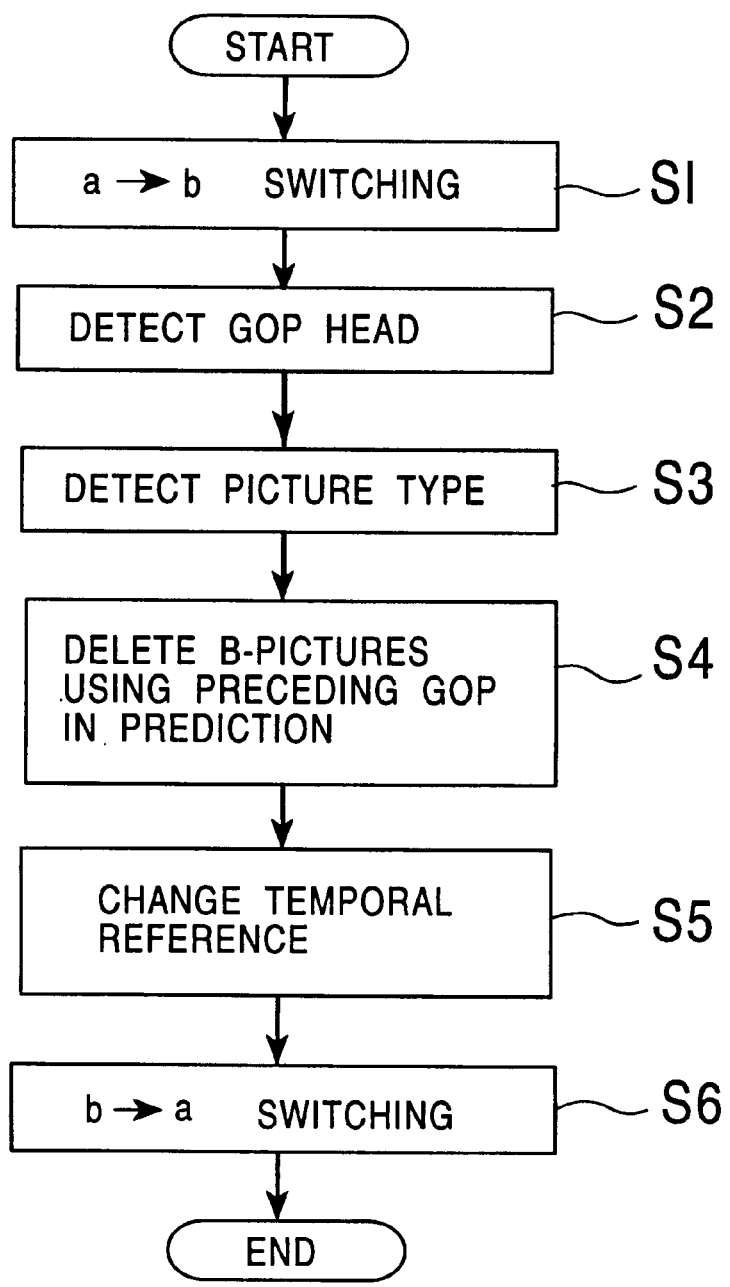
FIG. 8 is a flowchart for explaining the operation of the signal processing circuits 4X and 4Y of FIG. 7.

FIG. 7 shows an example of the configuration of the signal processing circuit 4 (each of 4X and 4Y) in FIG. 4.

The bit stream (the bit stream X or Y) from the FIFO memory 3 (3X or 3Y) is supplied to a GOP-head detecting circuit 11 (GOP detecting means), a B-picture filter 13 (deleting means) and a terminal a of a switch 15 (selecting means).

The GOP-head detecting circuit 11 detects the GOP by detecting the GOP head from the bit stream input to it, and then supplies the detected GOP to a picture-type detecting circuit 12 (picture-type detecting means). The GOP-head detecting circuit 11 also controls the switch 15.

The picture-type detecting circuit 12 detects the picture type (which one of I-, P- and B-pictures) for each of images forming the GOP supplied from the GOP-head detecting circuit 11, and then controls the B-picture filter 13 in accordance with the result of the detection. Incidentally, the picture type of each image is described in PCT (Picture Type Coding) which is specified in the picture layer, and the picture-type detecting circuit 12 detects the picture type of each image by referring to the PCT.

The B-picture filter 13 deletes the before-I-picture B-pictures from the GOP of the bit stream input to it under control of the picture-type detecting circuit 12, and then supplies the bit stream to a temporal-reference converting circuit 14 (changing means). The temporal-reference converting circuit 14 changes the temporal references of the images forming the GOP supplied from the B-picture filter 13, from which the before-I-picture B-pictures have been deleted, and then supplies that GOP to a terminal b of the switch 15.

The switch 15 is changed over to select the terminal a or b under control of the GOP-head detecting circuit 11.

The operation of the signal processing circuit 4 will be described below.

The switch 15 of the signal processing circuit 4 usually selects the terminal a. In a usual condition, therefore, the signal processing circuit 4 outputs the bit stream from the FIFO memory 3, as it is, through the switch 15.

Figure 5:
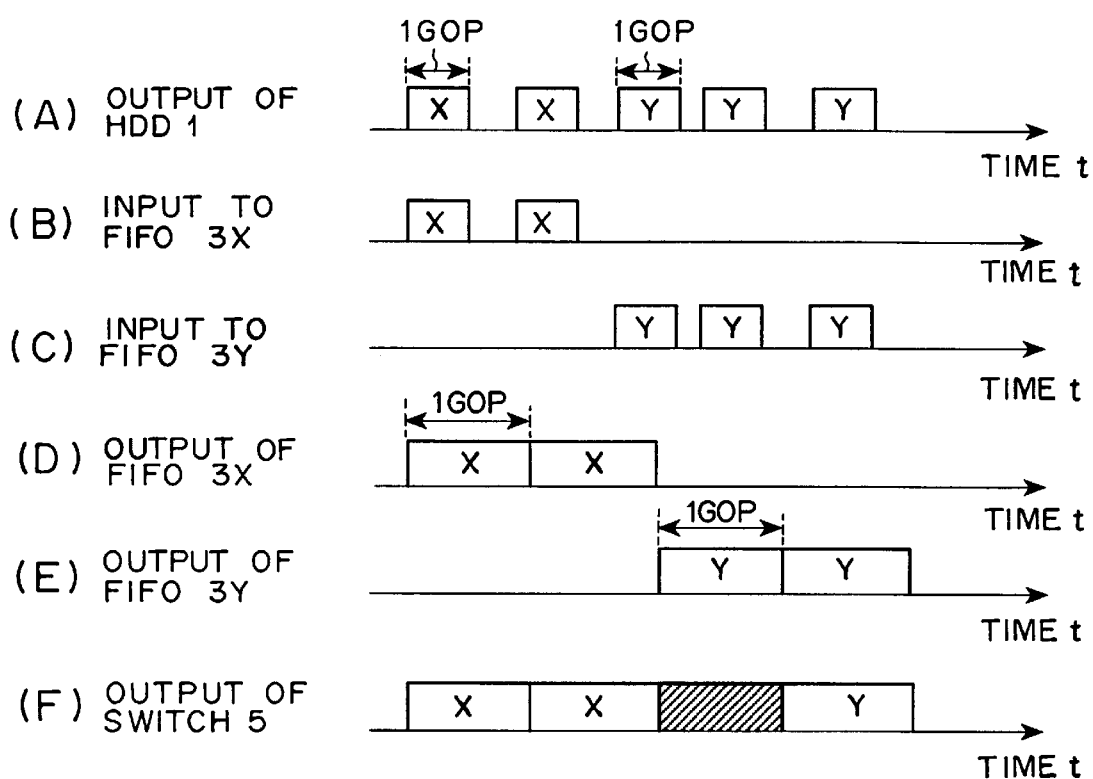
FIGS. 5(A) to 5(F) are timing charts for explaining the operation of the editing system of FIG. 4.

When the switch 5 in FIG. 4 is changed over from the terminal x to y or from the terminal y to x, the signal processing circuit 4Y or 4X connected to the closed terminal y or x executes processing in accordance with a flowchart of FIG. 5.

First, in step S1, the switch 15 is controlled by the GOP-head detecting circuit 11 to be changed over from the terminal a to b. Then, in step S2, the GOP-head detecting circuit 11 detects the first GOP from the bit stream input to it, and supplies the detected GOP to the picture-type detecting circuit 12. Upon receiving the GOP from the GOP-head detecting circuit 11, in step S3, the picture-type detecting circuit 12 detects the picture type of each of images forming the received GOP and controls the B-picture filter 13 to delete the before-I-picture B-pictures of that GOP.

More specifically, in this embodiment, each GOP is made up of images arranged in the order of $I_2$, $B_0$, $B_1$, $P_5$, $B_3$, $B_4$, $P_8$, $B_6$, $B_7$, $P_{11}$, $B_9$, $B_{10}$, $P_{14}$, $B_{12}$ and $B_{13}$ with a GOP head locating in the first position, as stated above. In the open GOP, B-pictures $B_0$ and $B_1$ locating in the second and third positions counted from the first image are the before-I-picture B-pictures which are predicted in two-way directions from $I_2$ and an image ($P_{14}$) forming one frame of the preceding GOP. The picture-type detecting circuit 12 therefore controls the B-picture filter 13 to delete the B-pictures $B_0$ and $B_1$ locating in the second and third positions counted from the first position of the current GOP.

In step S4, the B-picture filter 13 deletes the before-I-picture B-pictures $B_0$ and $B_1$ from the images forming the current GOP under control of the picture-type detecting circuit 12, and outputs the modified GOP to the temporal-reference converting circuit 14.

In step S5, the temporal-reference converting circuit 14 changes the temporal references of the images forming the GOP supplied from the B-picture filter 13, from which the before-I-picture B-pictures have been deleted.

Figure 9:
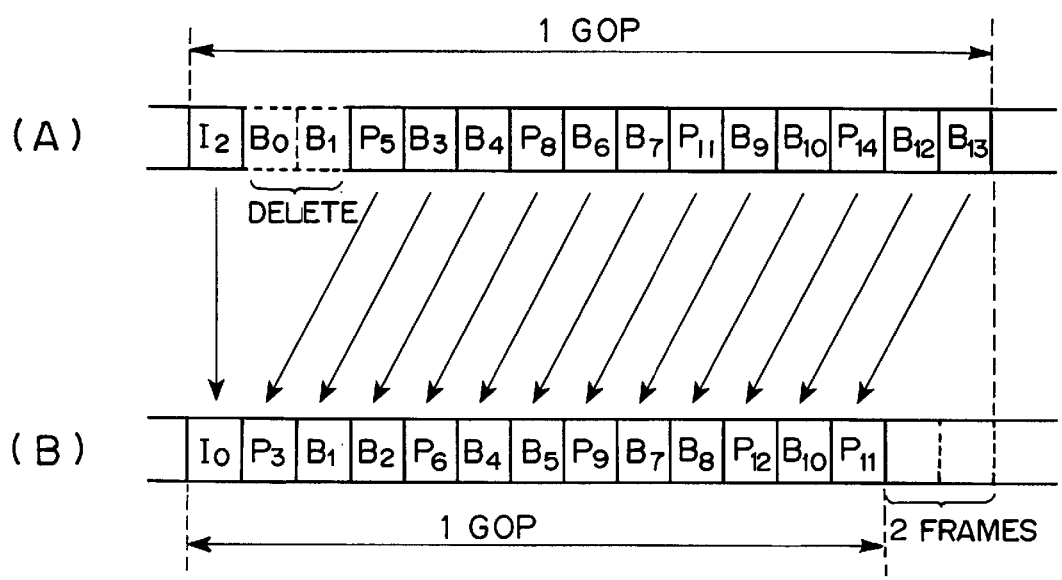
FIGS. 9(A) and 9(B) are charts for explaining the processing executed by a temporal reference converting circuit 14 in FIG. 7.

More specifically, when the before-I-picture B-pictures $B_0$ and $B_1$ are deleted from the GOP comprising a stream of $I_2$, $B_0$, $B_1$, $P_5$, $B_3$, $B_4$, $P_8$, $B_6$, $B_7$, $P_{11}$, $B_9$, $B_{10}$, $P_{14}$, $B_{12}$ and $B_{13}$, the remaining images are given by a stream of $I_2$, $P_5$, $B_3$, $B_4$, $P_8$, $B_6$, $B_7$, $P_{11}$, $B_9$, $B_{10}$, $P_{14}$, $B_{12}$ and $B_{13}$, as shown in FIG. 9(A). Because the temporal reference is started from not 0 but 2 in the resulting stream, it is changed so as to start from 0.

Practically, the temporal references for the images are changed from $I_2$, $P_5$, $B_3$, $B_4$, $P_8$, $B_6$, $B_7$, $P_{11}$, $B_9$, $B_{10}$, $P_{14}$, $B_{12}$ and $B_{13}$ to $I_0$, $P_3$, $B_1$, $B_2$, $P_6$, $B_4$, $B_5$, $P_9$, $B_7$, $B_8$, $P_{12}$, $B_{10}$ and $B_{11}$, as shown in FIG. 9(B).

The GOP made up of the images for which the temporal references have been changed, as explained above, is supplied to the terminal b from the temporal-reference converting circuit 14. Since the switch 15 has been changed over in step S1 and is now in a state to select the terminal b, the GOP output from the temporal-reference converting circuit 14 is delivered through the switch 15.

After that, when the GOP-head detecting circuit 11 detects the next GOP, i.e., the second GOP counted from the changing-over of the switch 5 in FIG. 4 from the terminal x to y or the terminal from y to x, it controls the switch 15 to be changed over from the terminal b to a. The switch 15 is thus changed over from the terminal b to a in step S6, thereby ending the process.

Accordingly, the second and subsequent GOP's counted from the changing-over of the switch 5 in FIG. 4 from the terminal x to y or the terminal from y to x are not subjected to extra processing and output, as they are, through the switch 15.

As described above, the signal processing circuit 4 (4X or 4Y) which is connected to the closed terminal y or x after the switch 5 in FIG. 4 has been changed over from the terminal x to y or the terminal from y to x, deletes the before-I-picture B-pictures $B_0$ and $B_1$ from the images forming the GOP which is first input to the signal processing circuit 4. This eliminates an estimation that is made from an image forming one frame of the preceding GOP which has no relation with the current GOP. As a result, even when editing is performed on the GOP-by-GOP basis in any manner, it is possible to avoid the occurrence of block noises in the images after the editing, and to prevent image quality from deteriorating remarkably.

In FIG. 9(A), deleting the before-I-picture B-pictures $B_0$ and $B_1$ creates a vacant space corresponding to two frames between $I_2$ and $P_5$. But this vacant space is absorbed upon the bit stream being temporarily stored in the buffer 6.

Because the vacant space corresponding to two frames is so absorbed, the GOP deprived of the before-I-picture B-pictures is made up of 13 frames of images $I_0$, $P_3$, $B_1$, $B_2$, $P_6$, $B_4$, $B_5$, $P_9$, $B_7$, $B_8$, $P_{12}$, $B_{10}$ and $B_{11}$ which are two less than 15 frames of images forming a normal GOP, as shown in FIG. 9(B). Subsequent to the above GOP displayed in the order of $I_0$, $B_1$, $B_2$, $P_3$, $B_4$, $B_5$, $P_6$, $B_7$, $B_8$, $P_9$, $B_{10}$, $B_{11}$ and $P_{12}$, pictures of the next GOP and so on are displayed successively. Finally, the last P-picture (i.e., the P-picture as the last one of frames forming images) is displayed in the tail two frames repeatedly by so-called freezing.

Figure 10:
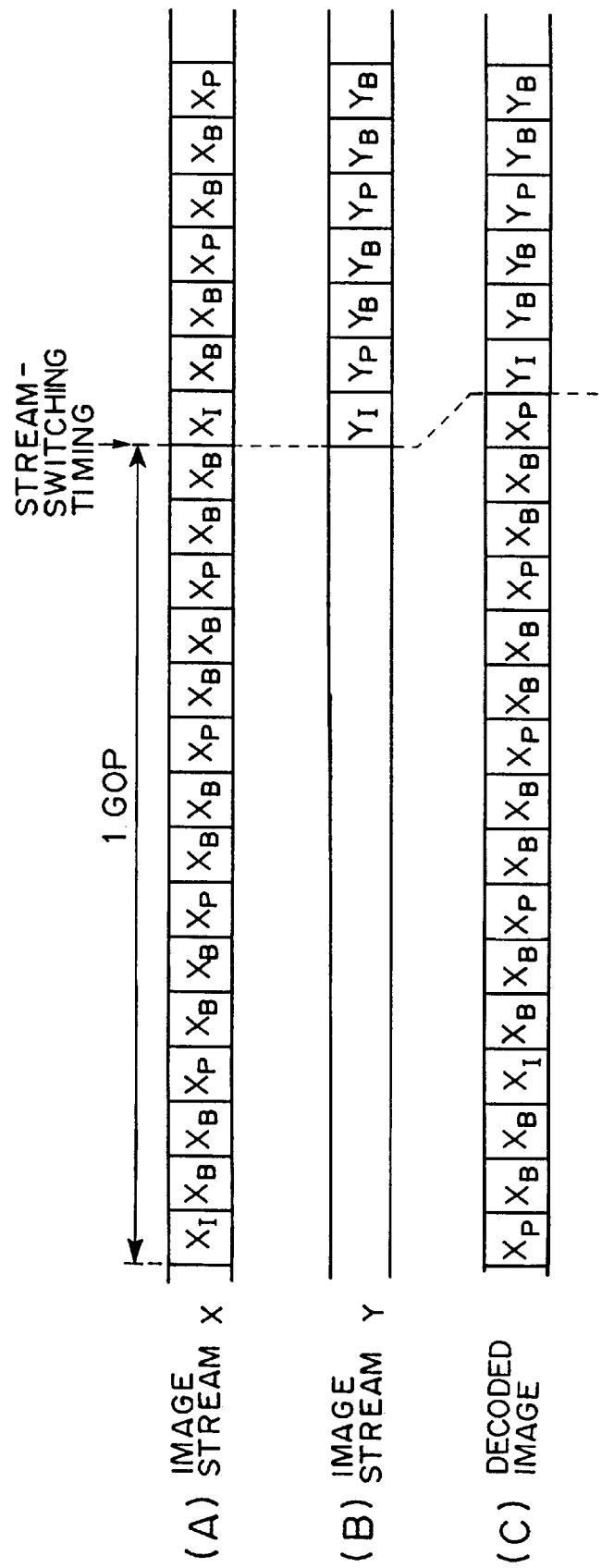
FIGS. 10(A) to 10(C) are charts for explaining the processing result of the signal processing circuit 4Y.

FIGS. 10(A) to 10(C) show, by way of example, the result of editing to insert the bit stream Y in the-bit stream X that is achieved through the above-mentioned processing executed by the signal processing circuit 4Y.

When the bit stream Y (FIG. 10(B)) is inserted in the bit stream X (FIG. 10(A)), the before-I-picture B-pictures which are to be predicted by using one of the images forming the last GOP of the preceding bit stream X are deleted from the first GOP of the bit stream Y in its inserted portion, as explained above. Consequently, image quality of the decoded images (FIG. 10(C)) is prevented from deteriorating at the joint between the bit streams X and Y.

Note that, in FIGS. 10(A) to 10(C) (also in FIGS. 2(A) to 2(C) as well), suffixes (I, P and B) of X or Y indicate the picture types of the frames forming the bit stream X or Y.

While the present invention has been described as being applied to the editing system for editing images subjected to the MPEG coding in the form of open GOP, the present invention can also be practiced in other suitable applications. For example, the present invention is applicable to a television broadcasting system in the case of, e.g., cutting out part of commercial images and transmitting bit streams related to different images because of change in time for program to be broadcast.

Additionally, the present invention can be applied to any types of bit streams which are provided through the MPEG coding in the form of open GOP, including MPEG 1 and MPEG 2.

According to the image processing method described above, the picture types of images forming one GOP are detected and B-pictures of the images forming the GOP, which are to be predicted by using one of images forming another GOP preceding the one GOP, are deleted in accordance with the detected picture types. It is therefore possible to prevent deterioration of image quality that would be otherwise caused by the B-pictures predicted by using one of the images forming the preceding GOP.

Further, the above-mentioned recording medium records therein a bit stream deprived of B-pictures of images forming one GOP in the bit stream which are to be predicted by using one of images forming another GOP preceding the one GOP. As a result, deterioration in quality of reproduced images can be prevented.

What is claimed is:

1. An image processing apparatus for processing a bit stream of images encoded according to the MPEG (Moving Picture Experts Group) coding standard including an open GOP (Group of Pictures) which is encoded with reference to another GOP, wherein a plurality of bit streams are to be joined, said apparatus comprising:

GOP detecting means for detecting GOPs from said bit streams; and deleting means for deleting a number of images, which are to be decoded on the basis of an image in another GOP, forming said open GOP of a first bit stream which is to be joined to a second bit stream.

2. The image processing apparatus according to claim 1, wherein each image is assigned a temporary reference according to said MPEG coding standard indicating an order of each image in said open GOP; further comprising changing means for changing said temporary reference of each image forming the open GOP of said first bit stream to account for said images which have been deleted by said deleting means.

3. The image processing apparatus according to claim 1, further comprising selecting means for, when said first bit stream is supplied, selecting the open GOP from which said images have been deleted and thereafter selecting other GOP's constituting said first bit stream.

4. The image processing apparatus according to claim 1, wherein said deleting means deletes in said open GOP the B-pictures which appear before the first I-picture in the open GOP.

5. The image processing apparatus according to claim 6, further comprising detecting means for detecting the B-pictures in said open GOP which are deleted by said deleting means.

6. The image processing apparatus according to claim 1, wherein a vacant space in said first bit stream is created when said images are deleted from said open GOP by said deleting means; further comprising a buffer for storing and retrieving said first bit stream including said vacant space, wherein said vacant space is removed when said first bit stream is retrieved from said buffer.

7. The image processing apparatus according to claim 6, wherein said vacant space of said first bit stream when retrieved from said buffer is shifted to an end of said open GOP such that said open GOP is missing a requisite number of images for MPEG decoding; further comprising means for repeating a number of images at said end of the open GOP to accommodate the missing images.

8. The image processing apparatus according to claim 1, further comprising an editor for joining said first and second bit streams.

9. The image processing apparatus according to claim 1, further comprising a television broadcasting system for editing out images corresponding to a commercial thereby joining said first and second bit streams.

10. The image processing apparatus according to claim 1, further comprising, a television broadcasting system for joining information in the form of said first bit stream relating to a change in timing for television programs to be broadcast.

11. An image processing method for processing a bit stream of images encoded according to the MPEG (Moving Picture experts Group) coding standard including an open GOP (Group of Pictures) which is encoded with reference to another GOP, wherein a plurality of bit streams are to be joined, said method comprising the steps of:

detecting GOPs from said bit streams; and deleting a number of images, which are to be decoded on the basis of an image in another GOP, forming said open GOP of a first bit stream which is to be joined to a second bit stream.

12. The image processing method according to claim 11, wherein said deleting step deletes in said open GOP the B-pictures which appear before the first I-picture in the open GOP.

13. The image processing method according to claim 12, further comprising the step of detecting the B-pictures in said open GOP which are deleted by said deleting step.

14. The image processing method according to claim 11, wherein a vacant space in said first bit stream is created when said images are deleted from said open GOP as a result of said deleting step; further comprising the step of storing and retrieving said first bit stream in a buffer including said vacant space such that said vacant space is removed when said first bit stream is retrieved from said buffer.

15. The image processing method according to claim 14, wherein said vacant space of said first bit stream when retrieved from said buffer in said storing and retrieving step is shifted to an end of said open GOP such that said open GOP is missing a requisite number of images for MPEG decoding; further comprising the step of repeating a number of images at said end of said open GOP to accommodate the missing images.

16. A recording medium produced by recording therein a bit stream of images encoded according to the MPEG (Moving Picture Experts Group) coding standard including an open GOP (Group of Pictures) which is encoded with reference to another GOP, wherein a plurality of bit streams are to be joined, and preventing from being recorded on said recording medium an image, which is to be decoded on the basis of an image in another GOP, of said open GOP in a first bit stream which is to be joined to a second bit stream.

17. The recording medium according to claim 16, wherein said recording medium is produced by further preventing from being recorded on said recording medium the B-pictures which appear before the first I-picture in the open GOP.

18. The recording medium according to claim 16, wherein said recording medium is produced by further preventing a vacant space from appearing in said GOP recorded on said recording medium when said images are prevented from being recorded on said recording medium.

19. The recording medium according to claim 18, wherein preventing said vacant space on said recording medium results in a shift of said images of said open GOP on said recording medium such that a number of images required for MPEG decoding are missing from an end of said open GOP; wherein said recording medium is produced by further repeating a recording of a number of images at said end of said open GOP to accommodate the missing images.

* * * * *